May 15, 1928.  
P. BASTIEN  
BRAKE  
Filed Nov. 8, 1923  
1,669,965  
3 Sheets-Sheet 1
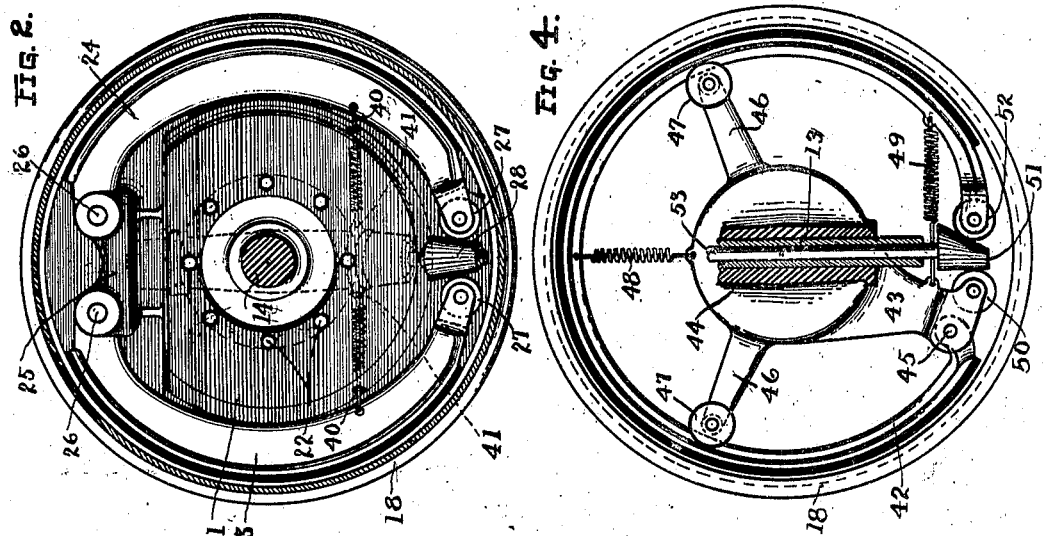
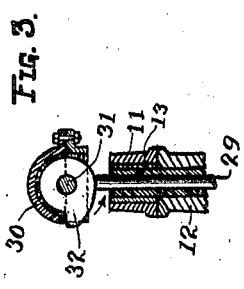
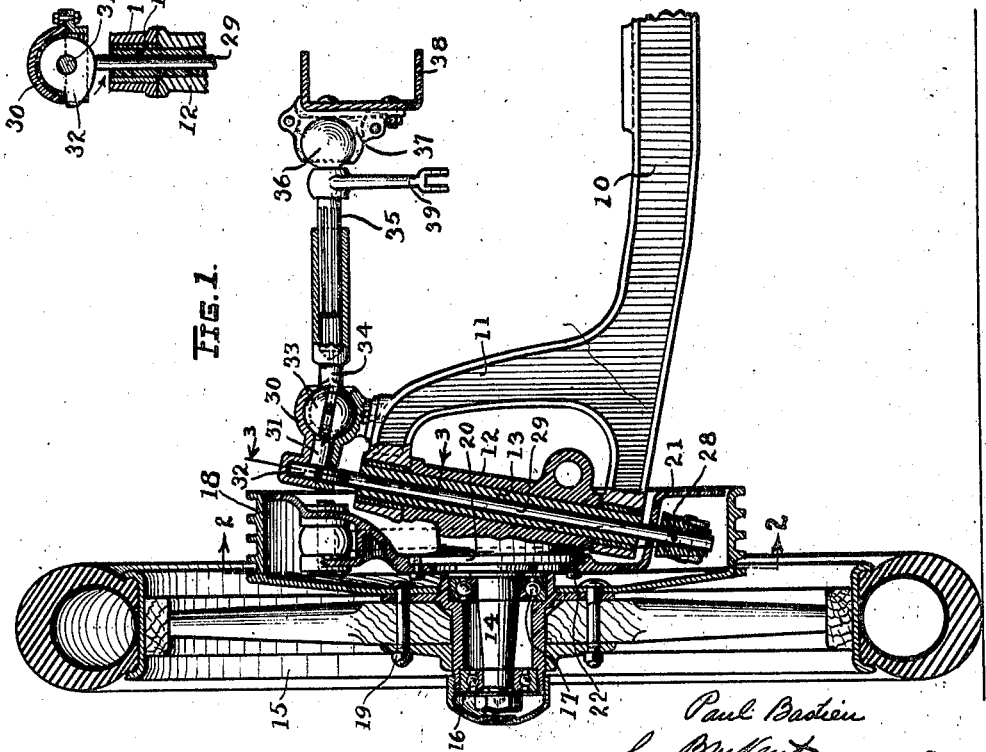
Paul Bastien  
Attorney

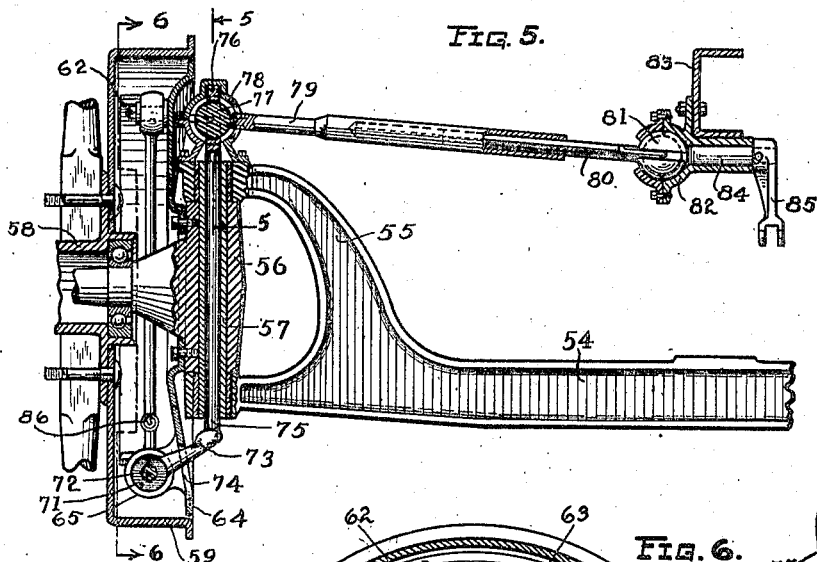
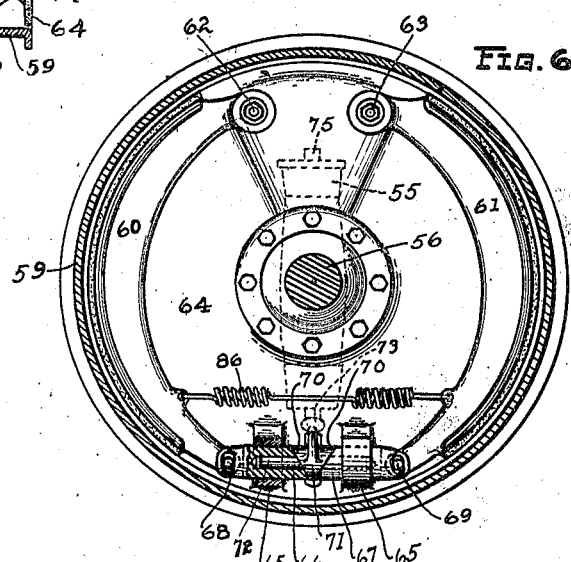
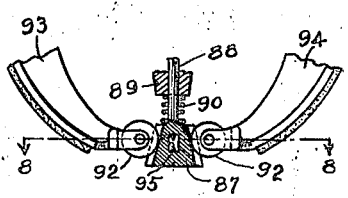
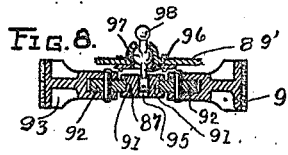

Patented May 15, 1928.

1,669,965

UNITED STATES PATENT OFFICE.

PAUL BASTIEN, OF CLEVELAND, OHIO.

BRAKE.

Application filed November 8, 1923. Serial No. 673,461.

This invention relates to vehicles and more particularly to brakes for steering wheels and has reference to that type of steering wheel which is pivotally mounted at the end of a relatively fixed axle.

It is one of the objects of the invention to provide an improved form of brake operating mechanism that will be comparatively simple in construction, effective in operation and that will not be detrimentally affected, as to its operation, by the steering movements of the vehicle.

A further object of the invention is to provide an improved brake operating mechanism embodying a rod slidable through the pivotal connection between the steering spindle and the axle in combination with a suitable cam for actuating the brake, to the end that the steering movements of the vehicle will not affect the application of the brake and, on the other hand, the application of the brake will not, in any way, affect the steering.

Other objects of the invention and the features of novelty will be apparent from the following description taken in connection with the accompanying drawings, of which:

Figure 1 is an axial section through a steering wheel having my invention applied thereto;

Fig. 2 is a vertical section on the line 2—2 of Fig. 1;

Fig. 3 is a detail section on the line 3—3 of Fig. 1;

Fig. 4 is a view similar to Fig. 2 but showing a modification;

Fig. 5 is a view similar to Fig. 1 but showing another form of the invention;

Figure 7:
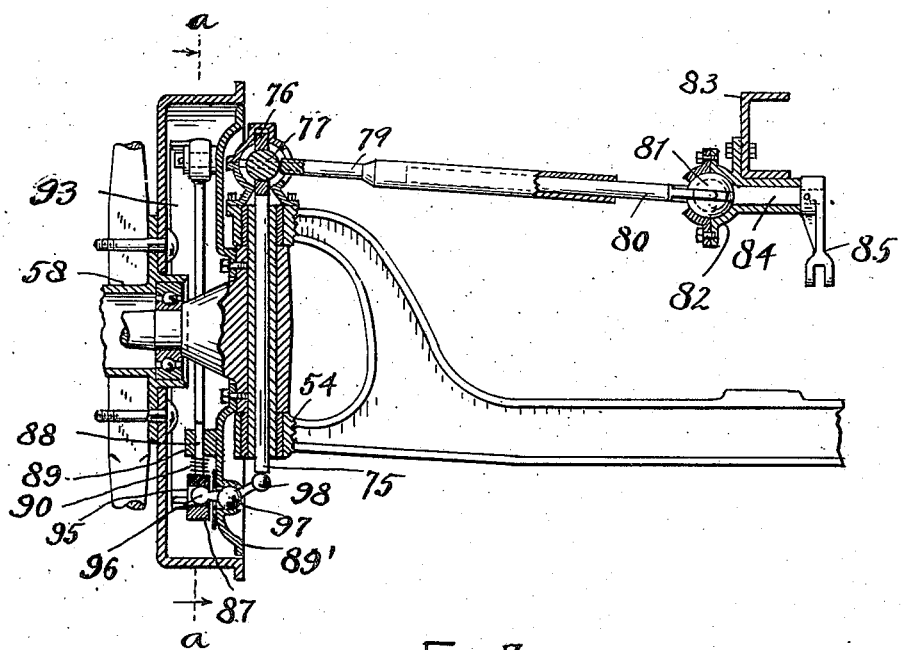

Fig. 5ª is a detail section on the line 5—5 of Fig. 5;

Fig. 6 is a vertical section on the line 6—6 of Fig. 5;

Fig. 7 is a view similar to Fig. 1 but showing still another form of the invention.

Fig. 7ª is a fragmentary side elevation of parts shown in Fig. 7, with certain parts shown in section on the line a—a of Fig. 7;

Fig. 8 is a section on the line 8—8 of Fig. 7ª.

Referring to the drawings, and more particularly to the form of the invention illustrated in Figs. 1, 2 and 3, 10 indicates a common form of motor vehicle front axle which is provided with yokes 11 at its opposite ends to which the steering spindle member 12 is connected by a hollow pivot 13. The wheel spindle of the member 12 is indicated at 14 and a wheel 15 is mounted thereon by means of ball bearings 16 and 17. The wheel 15 carries a brake drum 18 which is secured thereto by bolts 19 in accordance with the usual practice. There is a flange 20 on the member 12 to which a plate 21, which covers the open side of the brake drum 18, is secured by the bolts 22. Brake shoes 23 and 24 are pivotally mounted on the plate 21 and the bracket 25, on said plate, by means of the pins 26. The free ends of the shoes 23 and 24 carry the antifriction rollers 27 which cooperate with a conical actuating cam 28 that is mounted on the lower end of a rod 29 that extends through the pivot 13.

From Fig. 1 it will be observed that the plane of the rod 29 is at an angle to the plane of the brake shoes 23 and 24 but the cam 28 engages with the rollers 27 at the intersection of these planes.

A bearing bracket 30 is secured on the top of the yoke 11 and is split to receive the shaft 31 which carries the cam 32, this cam operatively engaging the upper end of the rod 29, as clearly shown in Fig. 3. The ball 33 of a universal joint is carried by the bracket 30 and forms a connection between the shaft 31 and a shaft 34, these shafts being provided with fingers engaging with right angularly arranged grooves in the ball 33, to form a universal joint connection, in accordance with the common practice, in making this type of universal joint.

The shaft 34 is telescoped with a shaft 35 with which it has a splined connection, and the shaft 35 has a ball 36 on its inner end which is supported in a bearing 37 that is mounted on the frame 38 of the vehicle. As is well known, the frame 38 has movement relative to the axle 10 and the balls 33 and 36 provide for such relative movement. An arm 39 on the shaft 35 is connected with the usual steering mechanism on the body of the vehicle for the purpose of steering the wheel 15. Springs 40, each having one end connected with the spindle member 12, as indicated at 41, and having its other end connected with one of the brake shoes, are provided for the purpose of withdrawing the shoes from contact with the brake drum 18 and holding the rollers 27 in contact with the cam 28.

In the operation of the form of the invention just described, the arm 39 is actuated to rotate the cam 32 which depresses the rod 29 and the cam 28 and spreads the brake shoes into contact with the drum 18. The steering movements of the wheel are not affected by the application of the brake shoes to the brake drum because, in the steering movements, the rollers 27 may travel around the cam 28 or the latter, with the rod 29, may turn, such turning of the rod 29 being provided for by the form of the contact with the cam 32. When the cam 32 is turned to release the brakes the springs 40 will retract the parts.

In the form of the invention illustrated in Fig. 4, a single brake 42 is employed, one end of this brake being pivotally connected with a bracket 43, on the steering spindle member 44, by means of the pin 45. The member 44 also carries brackets 46 having rollers 47 thereon to engage with the brake 42 to hold the latter in position. Springs 48 and 49 are attached to the brake 42 for withdrawing it from the brake drum 18. The bracket 43 also carries a roller 50 which contacts with one side of a cam 51 and a roller 52 on the free end of the brake 42 contacts with the opposite side of the cam 51. The side of the cam 51 which contacts with the roller 50 is of cylindrical form and the opposite side is of conical form as clearly shown in Fig. 4, the axes of said cylindrical and conical portions of the cam being on the axis of the rod 53 which carries the cam and which functions in the same manner as the rod 29 shown in Fig. 1. In this form of the invention the rod 53 may be actuated by mechanism similar to that for actuating the rod 29.

In the operation of this form of the invention, by depressing the rod 53 and the cam 51, the brake 42 may be expanded within the brake drum 18 and when the downward pressure on the rod 53 is relieved the cam and the brake will be retracted by the springs 48 and 49. The shape of the cam 51 permits the rollers 50 and 52 to swing around it during the steering movements of the wheel or the rod 53 and the cam 51 are, as a whole, turned with the wheel, as in the modification previously described.

In the form of the invention illustrated in Figs. 5 and 6 the axle 54 has the yoke 55 to which the steering spindle member 56 is connected by a hollow pivot pin 57. This arrangement differs from that shown in Fig. 1 in that the axis of the pivot 57 is more nearly vertical but otherwise the constructions are similar. The wheel 58 carries the brake drum 59 with which the brake shoes 60 and 61 cooperate, these shoes being pivoted at 62 and 63, respectively, to the plate 64, which closes the open side of the brake drum. The plate 64 is provided with a pair of laterally projecting lugs or brackets 65 in which the members 66 and 67 are slidable. The member 65 is connected by a pivot 68 with the free end of the shoe 60 and the member 67 is connected with the free end of the shoe 61 by a pivot 69. The opposed ends of the members 66 and 67 are provided with helical cam surfaces 70 with which a cam 71 cooperates, this cam being mounted on a shaft 72 which is supported in the axial bores in the members 66 and 67. The cam member 71 has an arm 73 thereon which projects through a slot 74 in the plate 64 and has its outer end in engagement with a rod 75 which is slidable in the pivot 57. A cam 76 engages with the upper end of the rod 75 and is carried by the ball 77 of a universal joint. The ball 77 and the cam 76 are rotatably mounted in the split bracket 78 that is secured on the top of the yoke 55. A shaft 79 having a yoked end to engage with the ball 77 has a telescopic and splined connection with the shaft 80, and the shaft 80 has a yoke which engages a ball 81 of a universal joint that is supported in the bracket 82 on the frame 83. A shaft 84 is carried by the bracket 82 and has a yoked end engaging the ball 81 to form a universal joint connection with the shaft 80, in accordance with the common usage. The shaft 84 has an arm 85 secured thereon and this arm is connected in any suitable manner with a brake lever on the body of the vehicle. The universal joints 77 and 81 and the telescoping connection between the shafts 79 and 80 permit freedom of movement of the frame 83 relative to the axle 54.

In the operation of the mechanism the cam 76 is rotated by moving the arm 85, as will be readily understood, and the cam 76 will depress the rod 75 and rock the cam 71 to spread the brake shoes 60 and 61 against the interior of the brake drum 59. The connection between the rod 75 and the arm 73 allows the steering movements of the wheel without in any way affecting the brake. When the arm 85 is released the parts are retracted by a spring 86 which has its opposite ends connected to the brake shoes 60 and 61.

In the form of the invention illustrated in Figs. 7 to 9, a different form of cam is employed and, in this case, the cam is in the form of a wedge 87 having a guide rod 88 thereon which projects through a boss 89 on the plate 89′, this plate being similar to the plate 64 with the exception that the lugs 65 are omitted. A spring 90 is arranged between the boss 89 and the wedge 87 to depress the latter. The sides of the wedge 87 are provided with grooves 91 to receive the rollers 92 on the free ends of the brake shoes 93, 94. The wedge 87 also has a slot 95 to receive the arm 96 of a lever 97 that is pivotally mounted on the plate 89′. The lever 97 also has an arm 98 which engages with the lower end of the rod 75 and is actuated thereby. The rod 75 will be actuated by any suitable mechanism such as either of those illustrated in Figs. 1 and 5.

In the operation of this form of the invention, the cam 87 is raised by depressing the rod 75 and this movement of the cam spreads the brake shoes 93 and 94. The brake shoes may be returned by a spring similar to the spring 86, and when the pressure on the rod 75 is relieved the spring 90 will depress the cam 87. As in the construction illustrated in Fig. 5, the loose engagement of the arm 98 with the rod 75 permits freedom in the steering movements of the wheel without affecting the brake action.

Having thus described my invention, what I claim is:

1. In vehicles, the combination of a frame, an axle, a steering wheel spindle, a hollow pin pivotally connecting said axle and steering spindle, a wheel mounted on said spindle and having a brake drum, a brake cooperating with said drum and anchored on said spindle, a cam for actuating said brake, a rod extending through said pivot and actuating said cam, a cam mounted on said axle and cooperating with said rod to move the latter axially of said pivot, a shaft mounted on said frame and having universal movement relative thereto, and a shaft having a universal joint connection with the second mentioned cam and a telescopic connection with the first mentioned shaft.

2. In a vehicle, the combination of an axle, a steering spindle member, a pivot connecting said member with said axle, a wheel mounted on said spindle and having a brake drum, a brake anchored on said member and having a free end with an antifriction roller thereon, a cam cooperating with said roller to expand said brake, a lever mounted for rocking movement in the plane of the axis of said pivot, and a rod movable axially through said pivot and operatively engaging said lever.

3. In vehicles, the combination of an axle, a steering spindle member, a pivot connecting said member with said axle, a wheel mounted on said spindle and having a brake drum, a brake cooperating with said drum, a wedge member slidable between the ends of said brake to actuate it, a lever pivotally mounted on said spindle member and having one arm connected with said wedge member to actuate the latter, said lever having another arm projecting into alignment with said pivot, and a rod slidable through said pivot and operatively engaging said arm.

In testimony whereof I affix my signature.

PAUL BASTIEN